United States Patent Office 3,591,339
Patented July 6, 1971

3,591,339
METHOD FOR PREPARING BINARY SALINE OR IONIC HYDRIDES
Jaroslav Vit, Vladimir Prochazka, and Bohuslav Casensky, Prague, Jiri Machacek, Krumvir, and Josef Vlk, Prague, Czechoslovakia, assignors to Ceskoslovenska akademie ved, Prague, Czechoslovakia
No Drawing. Filed May 15, 1967, Ser. No. 638,576
Claims priority, application Czechoslovakia,
May 17, 1966, 3,299/66
Int. Cl. C01b 6/04
U.S. Cl. 23—204
14 Claims

ABSTRACT OF THE DISCLOSURE

A process comprising reacting hydrogen and a metal Me in the presence of compounds of the general formula $Me^rQ^r$ wherein Q is an alkoxyl, aroxyl or aralkoxyl selected from the group consisting of substituents derived from etheralcohols obtainable by the alkylation of one hydroxyl group in diols and in polyglycols, and substituents derived from etheralcohols obtainable by alkylation of two hydroxyl groups in triols and substituents derived from aminoalcohols of the general formula $$R_{2-h}NH_hC_nH_{2n}OH$$

wherein R is an alkyl, $h$ is 0, 1, or 2, and $n$ is an integer between 1 and 15; and Me is an alkali metal, an alkaline earth metal, B, Al or Si; and $r$ is the valence of Me.

BRIEF SUMMARY OF THE INVENTION

This invention relates to the preparation of binary saline or ionic hydrides i.e. hydrides of alkali metals and alkaline earth metals including magnesium in finely powdered form and particularly hydrides of such elements as lithium, sodium, potassium, magnesium, calcium and the like. The properties of magnesium hydride appear to be somewhere between the ionic hydrides and covalent hydride. Thus, magnesium hydride can be considered to be a transition hydride between ionic and covalent hydrides. For convenience, it will be considered along with the ionic hydrides in this application.

Hydrides of alkali metals and of alkaline earth metals are frequently used as initial substances for a number of inorganic processes. They form either the base material for the production of different substances, particularly complex hydrides, or they are used in different branches of the chemical industry as valuable ingredients for instance as descaling agents in metallurgy for the pickling of steel sheets or plates, in the building trades as a foaming agent for lightweight porous building materials, in organic chemistry as alkylation and condensation agents or as siccatives and the like.

The preparation of these substances for industrial applications generally presents no difficulty since a product of superior purity and quality is ordinarily not required. The preparation of very pure products of superior quality with a large specific surface or surface distension has, however, not yet been achieved to a satisfactory degree.

For instance, if an interaction of pure lithium with electrolytical hydrogen of high purity takes place, a sinter-like substance results, which frequently contains metallic lithium either in a dispersed form or dissolved in lithium hydride. The preparation of lithium hydride having a large specific surface or surface distension i.e. in powdered form has not heretofore been achieved satisfactorily (see for instance Albert Mahe, Bull. Soc. Chem. France 1165/ 1950).

A certain increase of the specific surface or surface distension can be achieved by using as an initial substance a mixture of lithium oxide or lithium chloride and metallic magnesium (see U.S. Pats. 2,468,260 and 2,606,100). The thus prepared lithium hydride is equally sinter-like but can be more easily ground. The large specific surface or surface distension which is, however, frequently required cannot be achieved by this technique.

Similar conditions prevail in preparing potassium or sodium hydride, see T. R. P. Gibb, "Progress in Inorganic Chemistry" 3 (1962), 315. The alkali metals and alkaline earth metals suffer a volume contraction during the progress of adsorption of hydrogen gas into the metal surface because the density of the resulting hydrides is larger than that of the free metal, resulting in a barrier to further adsorption of hydrogen gas, and thus to the production of further hydride. Similar difficulties also occur during the hydriding of calcium with the difference that the interaction proceeds in part between the solid metal and hydrogen gas and only after a mixture with a lower melting point than calcium has been formed also between the melt and the gas. As an undesirable sinter-like form of calcium hydride results, a mixture of anhydrous calcium chloride $CaCl_2$ with metallic sodium instead of free calcium must be hydrided, similar to the case with lithium. The powdered product is obtained from the sinter-like mass either by grinding (see U.S. Pat. 2,702,234) or by eliminating the sodium chloride from the sinter-like mass by washing the same with liquefied ammonia (see U.S. Pat. 2,702,740). This technique is not particularly effective and moreover is very laborious and does not produce a hydride of sufficiently large specific surface or surface distension.

Saline or ionic hydrides of alkali metals and alkaline earth metals having a sufficient surface distension cannot be obtained, with the single exception of sodium hydride in oil suspension, by direct hydriding of these metals or their compounds. As these interactions do not proceed in a quantitative manner and, with the above said single exception, produce hydrides contaminated with non-consumed metals (which may be either dissolved or enclosed in the sinter-like mass), such hydrides cannot be used for technical purposes in many cases. These conditions exist as the saline or ionic hydrides are used both in organic or inorganic chemistry predominantly for reactions, proceeding in organic solvents, in which all saline or ionic hydrides are insoluble. Therefore their specific surface or surface distension must be as large as possible in order that the interaction can proceed in a reasonable time even in a medium in which they are insoluble.

Even by grinding the sinter-like hydride, there cannot be obtained as large a specific surface or surface distension as is possible, without grinding, by direct interaction in a reactor yielding the resulting hydride in powder form. In addition, the grinding of hydrides requires great care and is a difficult operation not only due to their extraordinary sensibility to moisture and to oxygen (whereby in some cases the grinding cannot be performed even in a nitrogen atmosphere), but also because the dispersed softened metal sticks to the grinding means. The free metal remaining as an impurity can cause undesired additional chemical reactions and makes the handling of the hydrides difficult.

Other methods for preparation of saline or ionic hydrides of alkali metals or alkaline earth metals with a large specific surface or surface distension produced by direct interaction have been therefore keenly sought.

In connection therewith, a number of catalysts and techniques have been proposed which, for some hydrides, are partially satisfactory but only in a single case i.e. in the preparation of sodium hydride, has a satisfactory product with a large specific surface or surface distension been obtained. This has been achieved by hydriding sodium suspension in an inert organic liquid, advantageously in paraffin oil (see U.S. Pats. 1,958,012 and 2,021,567).

This technique, however, can only be applied for the preparation of pure sodium hydride by the hydriding of pure sodium. The preparation of a mixture of sodium hydride with another alkali metal or alkaline earth metal hydride by hydriding a sodium alloy, results in a product having a surface distension smaller by several orders. It is impossible to prepare in this way the remaining binary saline or ionic hydrides of alkali metals or alkaline earth metals with sufficiently large surface distension.

No additional promotor is known at present which would enable the preparation of all hydrides of alkali metals and alkaline earth metals with a large surface distension by hydriding these metals and which would enable a direct preparation of mixtures of these metal hydrides, having large surface distension by direct interaction of alloys of these metals with hydrogen gas.

It is an object of this invention to provide a process for preparing powdered saline or ionic hydrides in the presence of substances which enable the hydriding of all said metals of their alloys.

This process is performed with the usual stirring at elevated temperature and high pressure, and in accordance with the present invention in the presence of a small amount of a surface active agent selected from a group of substances having the same inorganic or metal atom as in the hydride to be produced linked to a hydroxyl group either of an alcohol or of a monobasic carboxylic acid both having up to six carbon atoms and both containing at least one functional substituent, bonded to another one of the adjacent carbon atoms of the chain, said substituent being selected from the group, consisting of alkoxy-, alkylamino- and amino-substituents and having an atom which is regarded as a donor atom with the available extra electron-pair capable of entering into a hole of an acceptor atom. When the number of electron-pairs of the donor atom, e.g. oxygen or nitrogen, exceeds the number of its bonding electrons, then the free electron-pair is capable of being bonded by a metal acceptor atom. This effect is probably dependent on the behavior of the inorganic atom bonded at the end of the hydroxyl group which atom can be either an alkali metal, an alkaline earth metal or boron, aluminum or silicon.

The amount of surface active agent used is not critical, and will be dictated by the type of product desired. Small amounts of less than 1 mol percent, for instance of 0.1% are effective in producing a noticeable increase in surface distension of the product. We prefer to add only 0.2 mol percent of the said surface active agent, calculated on the molar amount of the metal present, because higher amounts only pollute the product whereas smaller amounts produce unnecessarily high homogenization.

It will be appreciated that the term hydride is used in this specification to also include a deuteride or tritide as substances derived from isotopes of ordinary hydrogen. This process, however, also yields products in which only a portion of the hydrogen has been replaced by deuterium or a part of the deuterium has been replaced by tritium. Undoubtedly, it is very difficult be separate any compound which has not been wholly converted or has been converted only to a minor extent into a deuterium or tritium compound, from the final products in which the deuterium or tritium exchange has taken place to a major extent.

In accordance with the invention hydrogen is reacted at elevated temperature and pressure in the presence of a compound of the general formula $Me^rQ^r$ wherein Q is an alkoxyl, aroxyl or aralkoxyl selected from the group consisting of substituents derived from etheralcohols obtained by the alkylation of one hydroxyl group in diols and in polyglycols, and substituents derived from etheralcohols obtainable by alkylation of two hydroxyl groups in triols and substituents derived from aminoalcohols of the general formula $R_{2-h}NH_hC_nH_{2n}OH$, wherein R is an alkyl, $h$ is 0, 1, or 2, and $n$ is an integer between 1 and 15 and Me is selected from the group consisting of alkali metals, alkaline earth metals, B, Al, and Si, $r$ being the valence of Me.

DETAILED DESCRIPTION

Among the substances which may be used as the surface active agents of the present invention are the metal alcoholates and metal salts of corresponding monocarboxylic acids derived from etheralcohols having the general formula $$ROC_nH_{2n}OH$$

wherein

R is hydrogen, $C_pH_{2p+1}$; $C_pH_{2p+1}(OC_nH_{2n})_m$ or $R'(OC_nH_{2n})_m$,
R' is aryl with 6 to 8 carbon atoms, or aralkyl with 7 to 8 carbon atoms,
$p$ is 1 to 6,
$n$ is 2 to 6, and
$m$ is 1 to 3;

aminoalcohols having the general formula $$R_2NC_nH_{2n}OH$$

wherein

R is hydrogen, lower alkyl having 1 to 6 carbon atoms, or

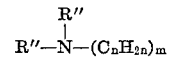

$n$ is 2 to 5;
$m$ is 1 to 3; and
R'' is hydrogen or lower alkyl having 1 to 6 carbon atoms;

aminoetheralcohols having the general formula $$R(XC_nH_{2n})_m\text{—}YC_nH_{2n}OH$$

wherein

R is hydrogen or a lower alkyl group having 1 to 6 carbon atoms,
X and Y are different and are selected from the group consisting of oxygen, —NH— or —NR—,
$n$ is 2 to 6, and
$m$ is 1 to 3.

It is evident that besides primary aminoalcohols, secondary bis- and tertiary tris-hydroxyalkylamines may be used.

Among the corresponding monocarboxylic acids are those derived from ethercarboxylic acids having the general formula $ROC_{n-1}H_{2n-2}COOH$, aminoacids having the general formula $R_2NC_{n-1}H_{2n-2}COOH$ or from amino ether acids having the general formula $$R(XC_nH_{2n})_m\text{—}YC_{n-1}H_{2n-2}COOH$$

Cyclic etheralcohols, aminoalcohols or aminoetheralcohols where R is cyclohexyl-, phenyl-, tolyl-, tetrahydrofurfuryl- and tetrahydropyranyl-derivatives such as phenyl Cellosolve may also be used.

The substances used as surface active agents can be referred to as metal etheralcoholates where with exception of the hydroxyl oxygen all other ether oxygen atoms could be replaced by an alkylamino-group whereby the thus obtained N-dialkylamino-etheralcoholates are of such structure where at least one of the ether groups is substituted by an alkylamine or dialkylamino-group advantageously so that all thus obtained amino-groups are tertiary groups.

As the effect of the agents used is determined by both terminal function groups i.e. by the hydroxyl group and by the donor atom it is obvious that the fundamental chain $C_nH_{2n}$ or $C_{n-1}H_{2n-2}$ can be modified or cyclicized in different manner. It is therefore possible to use with the same effect, for instance, alkoxycyclohexanol or N-dialkyl-amino-benzoic acid.

It is equally obvious that it is possible to introduce into the reaction medium the substances from which the agents are produced, such as esters of the said alcohols or acids i.e. ether-, amino- or aminoetheralcohols or ether-, amino- or aminoetheracids, as for instance, beta-methoxyethylester of acetic acid $CH_3COO.CH_2CH_2OCH_3$, ethylester of methoxyacetic acid $CH_3OCH_2COO.C_2H_5$ or N-dimethyl-beta-aminoethylester of methoxyacetic acid $$CH_3OCH_2COO.CH_2CH_2N(CH_3)_2$$

As to the explanation of the mechanism of the surface active agents here in question, it may be assumed that a small amount of the said substances causes a substantial increase of the specific surface of the produced hydrides. This effect can be explained by substantial reduction of loss of the surface tension or by transition of same to a negative surface tension, the so-called surface distension. While the surface tension causes an agglomeration of mass particles, as is the case in the course of forming liquid drops, the surface distension causes a fine dispersion state or an increase of the disperion of a non-wettable mass which is analogous to the creation of emulsions and colloidal solutions between liquids. A similar phenomenon in solid state mass is, for instance, the creation of spongeous lead in the course of forming accumulator electrodes or in the course of atomizing metal electrodes of a burning arc column immersed in a liquid where colloidal metal solutions are created with the co-action of electric energy.

The invention will next be illustrated in greater detail with reference to the following examples.

EXAMPLE 1

Into an autoclave of a volume of 2.5 liters, there were introduced 50 g. (7.17 mol) of lithium and 2 ml. of beta-methoxyethanol $CH_3OCH_2CH_2OH$, so-called methyl Cellosolve. A stirring rod is used for mixing the reaction mixture. Hydrogen gas at a pressure of 100 atmospheres is introduced into the autoclave and the autoclave is subsequently heated. The reaction starts at 170° C. and at 220° C. an exothermic reaction takes place, consuming hydrogen gas. The reaction is completed within half an hour. The yield is 57.5 g. of 97% lithium hydride, corresponding to 97.7% of theoretical. The product is in form of a white voluminous powder.

EXAMPLE 2

Into the same autoclave as in Example 1 the same initial substances were placed with the difference that 2 ml. of N-dimethylaminoethanol $(CH_3)_2NCH_2CH_2OH$ was used instead of the so-called methyl Cellosolve. The reaction proceeds in a similar manner yielding 58.9 of 95% lithium hydride, corresponding to 98% of theoretical. The product is again a white voluminous powder.

EXAMPLE 3

Into the same autoclave were introduced, 62 g. of 77.5% (2 mol) magnesium and 2 ml. of γ-phenoxypropanol $C_6H_5OCH_2CH_2CH_2OH$, so-called phenyl Cellosolve, together with steel balls for stirring the reaction mixture. The autoclave was then filled with hydrogen gas at a pressure of 100 atm. The reaction starts at 210° C. and is finished with 2.5 hours at 220° C. The yield is 65 g. of 78.4% magnesium hydride corresponding to 98% of theoretical. The product is a grayish but voluminous powder.

EXAMPLE 4

Into the same autoclave, there were introduced 164 g. (4.09 mol) of calcium in the form of shavings and 2 ml. of tetrahydrofurfurylalcohol, and a stirring rod is used for mixing the reaction mixture as in Example 1. The exothermic reaction starts at 220° C. under consumption of hydrogen. The reaction mixture is heated in the course of the interaction up to 360° C. The reaction is finished within half an hour and the yield is 168.5 g. of 98% calcium hydride in the form of white voluminous powder corresponding to 96% of theoretical.

EXAMPLE 5

Into a 2.5-liter rotating autoclave there were introduced a given amount of metal, surface active agent and six steel balls of a diameter of 30 mm. acting as stirring means. Only for the production of magnesium hydride were a larger number of smaller steel balls of a diameter of 12 mm. used. The autoclave, after having been flushed with hydrogen, is filled with hydrogen at a pressure of 100 atm. The autoclave was subsequently heated to the reaction temperature for the time required for the whole reaction process i.e. as long as hydrogen gas is consumed. The reaction temperature varies within the range of 200 up to 300° C. and for exothermic reactions rises in some cases up to 360° C.

After cooling, the residual hydrogen is discharged, the product is emptied using a sieve for retaining the steel balls. The product is weighed, analyzed and its purity determined. A product of a specific surface from 0.5 to 3.6 sq. m./g. has been obtained in all cases mentioned in the following Table I.

TABLE I

| Number | Metal | Weight in g. | Agent | Weight in g. | Time (minutes) | Yield in g. | Yield in percent | Purity |
|---|---|---|---|---|---|---|---|---|
| 5 | Li | 50 | $CH_3O(CH_2)_6OLi$ | 2 | 25 | 57.55 | 98.1 | 97.4 |
| 6 | Li | 50 | $CH_3-\langle\bigcirc\rangle-OCH_2CH_2CH_2OH$ | 2 | 35 | 58.37 | 99.2 | 97.2 |
| 7 | Na | 100 | $\langle\bigcirc\rangle-OCH_2CH_2ONa$ | 2 | 60 | 106.16 | 99.0 | 97.3 |
| 8 | Li | 50 | $B(OCH_2CH_2OCH_3)_3$ | 1.8 | 55 | 58.63 | 98.1 | 95.6 |
| 9 | Li | 50 | ⬡—OH, —N(CH₃)₂ | 2 | 40 | 58.34 | 97.3 | 95.3 |
| 10 | K | 100 | (furan)—$CH_2OK$ | 2 | 35 | 103.5 | 98.2 | 97.3 |
| 11 | Mg | 60.8 | (furan)—$CH_2OH$ | 2 | 150 | 66.02 | 97.9 | 78.1 |

TABLE I—Continued

| Number | Metal | Weight in g. | Agent | Weight in g. | Time (minutes) | Yield in g. | Yield in percent | Purity |
|---|---|---|---|---|---|---|---|---|
| 12 | Ca | 80.1 | (furyl)-OCH$_2$CH$_2$OH | 2 | 25 | 83.94 | 96.7 | 96.9 |
| 13 | Ba | 137.3 | nC$_6$H$_{13}$OCH$_2$CH$_2$OH | 1 | 40 | 141.1 | 98.3 | 97.1 |
| 14 | Li | 50 | CH$_3$OCH$_2$COOC$_2$H$_4$N(CH$_3$)$_2$ | 2 | 35 | 58.64 | 98.8 | 96.2 |
| 15 | Li | 50 | (furyl)-COOLi | 2 | 45 | 56.9 | 97.9 | 98.3 |
| 16 | Li | 50 | (CH$_3$)$_2$N(C$_2$H$_4$O)$_3$H | 2 | 25 | 58.44 | 98.9 | 96.7 |
| 17 | Li | 50 | HN(CH$_2$CH$_2$OH)$_2$ | 2 | 40 | 57.55 | 97.6 | 96.9 |
| 18 | Li | 50 | N(CH$_2$CH$_2$OH)$_3$ | 2 | 30 | 58.33 | 98.3 | 96.3 |
| 19 | Li | 50 | (CH$_3$)$_2$N-C$_6$H$_3$(OH)(OCH$_3$) | 2 | 40 | 59.06 | 98.3 | 95.1 |
| 20 | Li | 50 | NaAlH$_2$(OCH$_2$CH$_2$OCH$_3$)$_2$ | 2 | 20 | 57.55 | 97.8 | 97.1 |
| 21 | Na | 100 | (furyl)-CH, -OCH$_3$ | 2 | 40 | 105.64 | 97.7 | 96.5 |
| 22 | Na | 100 | (furyl)-OH, -OCH$_3$ | 2 | 40 | 105.0 | 97.8 | 97.2 |
| 23 | Na | 100 | CH$_3$O-C$_6$H$_4$-OH | 2 | 35 | 106.5 | 98.8 | 96.8 |
| 24 | Na | 100 | (CH$_3$)$_2$NCH$_2$COOH | 2 | 45 | 106.06 | 98.7 | 97.1 |
| 25 | Na | 100 | CH$_3$OCH$_2$CCONa | 2 | 30 | 104.87 | 98.6 | 98.1 |
| 26 | Na | 100 | Si(OCH$_2$CH$_2$OCH$_3$)$_4$ | 2 | 45 | 105.96 | 98.3 | 96.8 |
| 27 | Na | 100 | CH$_3$O-C$_6$H$_3$(OH)-N(CH$_3$)$_2$ | 2 | 50 | 105.06 | 98.4 | 96.9 |
| 28 | Na | 100 | (CH$_3$)$_2$N-C$_6$H$_4$-COOH | 2 | 50 | 105.1 | 97.9 | 97.2 |
| 29 | Na | 100 | CH$_3$OCH$_2$CH$_2$N(CH$_3$)CH$_2$COOH | 2 | 40 | 105.47 | 98.2 | 97.15 |
| 30 | Na | 100 | CH$_3$O(CH$_2$)$_2$OCH$_2$COONa | 2 | 45 | 105.63 | 98.5 | 97.3 |
| 31 | Ca | 80.1 | (furyl)-CH$_2$OCH$_2$CH$_2$OH | 1 | 25 | 85.06 | 98.3 | 97.2 |
| 32 | Ca | 80.1 | C$_6$H$_5$-OC$_2$H$_4$OCH$_2$CH$_2$CH$_2$OH | 1.5 | 30 | 84.55 | 97.6 | 97.1 |
| 33 | Ca | 80.1 | (CH$_3$OCH$_2$CH$_2$)$_2$NC$_2$H$_4$OH | 2 | 25 | 83.42 | 96.1 | 96.9 |
| 34 | Ca | 80.1 | Al(OCH$_2$CH$_2$N(CH$_3$)$_2$)$_3$ | 2 | 35 | 85.08 | 97.2 | 96.1 |
| 35 | Ca | 80.1 | NaB(OCH$_2$CH$_2$OCH$_3$)$_4$ | 2 | 30 | 85.61 | 97.5 | 95.8 |
| 36 | Mg | 60.8 | CH$_3$OCH$_2$CH$_2$OCH$_2$CH$_2$OH | 2 | 120 | 66.89 | 96.9 | 76.3 |
| 37 | Mg | 60.8 | B(O-CH$_2$-furyl)$_3$ | 2 | 130 | 57.72 | 97.2 | 75.6 |
| 38 | Mg | 48.6 | CH$_3$(OC$_2$H$_4$)$_3$OH | 2 | 135 | 52.18 | 95.8 | 96.7 |
| 39 | Mg | 62.0 | CH$_3$OCH$_2$CH$_2$OH | 2 | 150 | 65 | 98 | 78.4 |
| 40 | Ba | 137.3 | C$_2$H$_5$O(CH$_2$)$_2$O(CH$_2$)$_4$OH | 1 | 30 | 140.6 | 97.8 | 96.85 |
| 41 | K | 100 | (CH$_3$)$_2$N(CH$_2$)$_5$OH | 2 | 30 | 103.08 | 97.3 | 96.8 |
| 42 | K | 100 | AlCl(OCH$_2$CH$_2$OCH$_3$)$_2$ | 3.5 | 40 | 103.75 | 95.8 | 94.7 |
| 43 | K | 100 | ((furyl)-CH$_2$)$_2$N(CH$_2$)$_4$OK | 3 | 35 | 103.61 | 98.1 | 97.1 |
| 44 | K | 100 | (furyl)-CH$_2$OCH$_2$CH$_2$CH$_2$OH | 2 | 30 | 103.30 | 97.9 | 97.2 |

TABLE I—Continued

| Number | Metal | Weight in g. | Agent | Weight in g. | Time (minutes) | Yield in g. | Yield in percent | Purity |
|---|---|---|---|---|---|---|---|---|
| 45 | Sr | 87.6 | $CH_3N\begin{matrix}(CH_2)_2OCH_3\\(CH_2)_2OH\end{matrix}$ | 2 | 30 | 90.34 | 97.2 | 96.4 |
| 46 | Na | 100 | $CH_3COOCH_2CH_2OCH_3$ | 2 | 40 | 106.95 | 97.5 | 95.1 |
| 47 | Na | 100 | $CH_3OCH_2COOC_2H_5$ | 2 | 45 | 105.10 | 96.9 | 96.2 |

EXAMPLE 6

Into a 2.5-liter autoclave with stirring means there was introduced a dispersion of a metal with a surface active agent. The autoclave is closed and connected to a hydrogen pressure source by way of a pressure reducing valve. After blowing-out and filling with hydrogen at a pressure of 5 atm. the reaction mixture is heated while stirring at 200 revolutions per minute. After a reaction temperature has been achieved, the autoclave is maintained at a constant pressure of 10 atm. for the entire reaction period. The reaction temperature of about 200 up to 300° C. is maintained. After the reaction is finished, the autoclave is cooled and emptied. The product was weighed, analyzed and the purity of the same expressed in relation to the dry state as shown in Table II.

The primary dispersion of lithium, sodium or potassium was prepared by emulgation of the molten metal in the dispersing medium used, usually oil, using a homogenizer. The dispersion of other metals can be prepared from fine shavings, chips or file dust.

TABLE II

| No. | Dispersion | Metal cont. | Oil cont. | Agent | Weight in g. | Time (minutes) | Yield in g. | Yield in percent | Purity |
|---|---|---|---|---|---|---|---|---|---|
| 49 | 446 | Na 46 | 400 | $CH_3OCH_2CH_2OH$ | 1 | 10 | 50.2 | 98.6 | 94.3 |
| 50 | 440 | Li 40 | 400 | $(CH_3)_2NCH_2CH_2OH$ | 1 | 30 | 48.1 | 97.2 | 93.3 |
| 51 | 450 | K 50 | 400 | $\begin{matrix}CH_3\\C_2H_5\end{matrix}\!\!NCH_2CH_2OH$ | 1 | 10 | 54.1 | 98.0 | 92.9 |
| 52 | 460 | Ca 60 | 400 | $(CH_3)_2N(C_2H_4O_2)H$ | 1 | 30 | 66.3 | 97.6 | 92.7 |
| 53 | 546 | Na 46 | 500 | $H_2N(CH_2)_2O(CH_2)_2OH$ | 1 | 15 | 50.8 | 96.9 | 91.5 |
| 54 | 646 | Na 46 | 600 | $(CH_3)_2NCH_2CH_2COONa$ | 1.5 | 20 | 50.0 | 97.5 | 93.6 |
| 55 | 496 | Na 46 | ¹ 450 | $(CH_3)_2NC_2H_4\overset{CH_3}{\underset{|}{N}}C_2H_4OH$ | 1 | 10 | 58.5 | 97.7 | 96.8 |
| 56 | 435 | Li 35 | 400 | $(CH_3)_2NC_2H_4\overset{CH_3}{\underset{|}{N}}C_4H_8OH$ | 1= | 25 | 41.8 | 97.1 | 93.0 |
| 57 | 535 | Li 35 | 500 | $C_2H_5OC_3H_6NC_2H_4OH$ | 1 | 20 | 41.6 | 97.8 | 94.2 |

¹ Toluene.

EXAMPLE 7

Into the same pressure vessel as in Example 1 were charged 100 g. Na (4.34 moles), 2 g.

$(CH_3)_2NCH_2CH_2ONa$ and a stirrer. Deuterium of 99.65% D-purity was introduced into the pressure vessel to establish a pressure of 75 atmospheres. The reaction started at 270° C.; the temperature was kept in the range between 270 and 310° C. The reaction was finished after 105 minutes; 109.7 g. of sodium deuteride was obtained, containing 96.3% NaD of a 99.03% D-purity, i.e., 97% of theoretical. The specific surface of the product, which was obtained in form of a fine white powder, amounted to 2.8 m.²/g.

What is claimed is:

1. In a process for preparing a hydride of an alkali metal, and alkaline earth metal or magnesium by direct interaction of the metal or metal alloy with hydrogen gas with stirring at elevated temperature and pressure, an improvement comprising effecting the interaction in the absence of any dispersion medium and in the presence of a relatively small amount of a surface active agent having an inorganic or metal atom selected from the group consisting of alkali metals alkaline earth metals, boron, aluminum, and silicon linked to the hydroxyl group of either an alcohol or a monocarboxylic acid both having up to six carbon atoms and both containing at least one functional sustituent, linked to a carbon atom of the chain other than the carbon atom to which the hydroxyl group is linked, said substituent being selected from the group consisting of alkoxy-, alkylamino- and amino-substituents, having an atom which is regarded as a donor atom with the available extra electron-pair capable of entering into a hole of an acceptor metal atom.

2. An improvement as set forth in claim 1 wherein said surface active agent is a metal alcoholate derived from etheralcohols having the general formula $ROC_nH_{2n}OH$, wherein R is hydrogen, $C_pH_{2p+1}$; $C_pH_{2+1}(OC_nH_{2n})_m$; or $R'(OC_nH_{2n})_m$, R' being aryl with 6 to 8 carbon atoms, p being 1 to 6, n being 2 to 6, and m being 1 to 3.

3. An improvement as set forth in claim 1 wherein said surface active agent is a metal alcoholate derived from aminoalcohols having the general formula $R_2NC_nH_{2n}OH$ wherein R is hydrogen, lower alkyl having 1 to 6 carbon atoms, or $$R''-\underset{\underset{R''}{|}}{N}-(C_nH_{2n})_m$$

n is 2 to 6; m is 1 to 3; and R'' is hydrogen or lower alkyl having 1 to 6 carbon atoms.

4. An improvement as set forth in claim 1 wherein said surface active agent is a metal alcoholate derived from aminoetheralcohols having the general formula $$R(XC_nH_{2n})_m-YC_nH_{2n}OH$$

in which R is hydrogen or a lower alkyl group having 1 to 6 carbon atoms, X and Y are different and are selected from the group consisting of O, NH and NR; n is 2 to 6; and m is 1 to 3.

5. An improvement as set forth in claim 2 wherein said surface active agent is a metal salt of a monocarboxylic acid corresponding to the said aminoalcohols and derived from ethercarboxylic acids having the general formula $ROC_{n-1}H_{2n-2}COOH$.

6. An improvement as set forth in claim 3 wherein said surface active agent is a metal salt of a monocarboxylic acid corresponding to the said aminoalcohols and derived from amino-acids having the general formula $$R_2NC_{n-1}H_{2n-2}COOH$$

7. An improvement as set forth in claim 4 wherein said surface active agent is a metal salt of a mooncarboyxlic acid corresponding to the said aminoetheralcohols and derived from amino-etheracids having the general formula $R(XC_nH_{2n})_m-YC_{n-1}H_{2n-2}COOH$.

8. In a process as set forth in claim 1 the further improvement comprising introducing substances into the reaction mixture, from which the surface active agent is produced in situ under the reaction conditions.

9. An improvement as set forth in claim 8 wherein said substances which are introduced into the reaction mixture, from which the surface active agents are produced under the reaction conditions, are esters of said alcohols or monocarboxylic acids.

10. In a process for preparing ionic hydrides and/or deuterides and/or tritides of alkali metals and alkaline earth metals inclusive of magnesium by the interaction of hydrogen with the metals at elevated temperatures and pressure while stirring, an improvement comprising effecting said process in the absence of any dispersing medium and in the presence of compounds of the general formula $Me^rQ^r$, wherein Q is an alkoxyl, aroxyl or aralkoxyl selected from the group consisting of substituents derived from etheralcohols obtainable by the alkylation of one hydroxyl group in diols and in polyglycols, and substituents derived from ether-alcohols obtainable by alkylation of two hydroxyl groups in triols and substituents derived $R_{2-h}NH_hC_nH_{2n}OH$, wherein R is an alkyl, $h$ is 0, 1, or 2, and $n$ is an integer between 1 and 15, and Me is selected from the group consisting of alkali metals, alkaline earth metals, B Al and Si, and $r$ is the valence of Me.

11. An improvement as defined in claim 10 wherein Q is $CH_3OCH_2CH_2O$— and wherein the hydrogen, Me, and $CH_3OCH_2CH_2OH$ are charged into and reacted in a reaction pressure vessel.

12. An improvement as defined in claim 11 wherein Me is lithium and the reaction is carried out at 170 to 360° C.

13. An improvement as defined in claim 11 wherein Me is sodium, and the reaction is carried out at 220–300° C., the $CH_3OCH_2CH_2OH$ being charged into the said vessel in an amount between 0.003 and 0.1 molar percent of the molar amount of sodium, the reaction thus being carried out in the presence of $NaOCH_2CH_2OCH_3$ which is formed.

14. An improvement as set forth in claim 1 wherein the relatively small amount of said surface active agent is less than 1 mol percent based on the molar amount of the metal.

References Cited

UNITED STATES PATENTS

| 2,372,670 | 4/1945 | Hansley | 23—204 |
|---|---|---|---|
| 2,392,545 | 1/1946 | Pechet | 23—204 |
| 2,768,064 | 10/1956 | Baldridge | 23—204 |
| 2,946,662 | 7/1960 | Mosely | 23—204 |
| 3,222,288 | 12/1965 | Hansley | 23—204 |
| 2,642,344 | 6/1953 | Livingston | 252—309X |

FOREIGN PATENTS

| 1,421,346 | 1965 | France | 252—309F |

OSCAR R. VERTIZ, Primary Examiner

G. O. PETERS, Assistant Examiner